(12) United States Patent
Noren et al.

(10) Patent No.: US 6,446,091 B1
(45) Date of Patent: Sep. 3, 2002

(54) METHOD AND APPARATUS FOR UNDELETING FILES IN A COMPUTER SYSTEM

(75) Inventors: Gregory T. Noren, The Woodlands; John M. Cagle, Houston; Mark R. Potter, Tomball, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/363,443

(22) Filed: Jul. 29, 1999

(51) Int. Cl.[7] ............................................. G06F 12/00
(52) U.S. Cl. ..................... 707/202; 707/200; 707/203; 707/205; 707/10
(58) Field of Search ................................. 707/202, 204, 707/1, 7, 200, 201, 203, 205, 206, 10

(56) References Cited

U.S. PATENT DOCUMENTS 5,799,147 A * 8/1998 Shannon ........................ 714/5
5,958,005 A * 9/1999 Thorne et al. ................. 380/51
5,983,241 A * 11/1999 Hoshino ..................... 707/200
6,018,744 A * 1/2000 Mamiya et al. ................ 707/1
6,101,505 A * 8/2000 Sun ............................. 707/10

OTHER PUBLICATIONS

Held (Network undelete for Windows NT 4.04, ACM, International Journal of Network Management, vol. 9, issue 2, pp. 126–132, Apr. 1999).*

Moran (Undelete Helps Fill NT Gaps, Windows Sources, Jun. 19, 1998, accessed on Oct. 9, 2001 from http://www-.zdnet.com/filters/printerfriendly/0,6061,319700–3,00.html).*

Moller (Bringing Files Back from Beyond, PC Magazine, Jul. 19, 1998, accessed on Oct. 9, 2001 from http://www-.zdnet.com/filters/printerfriendly/0,6061,334000–3,00.html).*

Wacker (Resurrecting Files Across an Enterprise, eWeek, May 15, 1998, accessed on Oct. 9, 2001 from http://www-.zdnet.com/filters/printerfriendly/0,6061,315799–3,00.html).*

Mark Minasi, The Expert Guide to Windows 95, Sybex Inc., 1996, p. 359–362 and 429–430.

IBM Technical Disclosure Bulletin, Apr. 1993, vol. 36, No. 4, pp. 373–375.

* cited by examiner

*Primary Examiner*—Jean M. Corrielus
*Assistant Examiner*—Joon Hwan Hwang
(74) *Attorney, Agent, or Firm*—Conley, Rose & Tayon, P.C.

(57) ABSTRACT

A method for undeleting files in a computer system includes flagging at least one deleted file with an identifier. The flagged deleted file is hidden in the computer system. A list of deleted files that have been flagged with the identifier is generated. The list of deleted files is comprised of a directory path hierarchy for each deleted file. A file is selected from the list of deleted files and undeleted.

29 Claims, 4 Drawing Sheets

METHOD AND APPARATUS FOR UNDELETING FILES IN A COMPUTER SYSTEM

BACKGROUND OF THE INVENTION

1. Field of the Invention

This invention relates generally to computer systems, and, more particularly, to a method and apparatus for undeleting files in a computer system.

2. Description of the Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. For example, a computer connected to a network may communicate with other computers that are also connected to the network. Furthermore, the computer network may be used to share data, peripherals, or any other resources that are made available on the network.

The interconnection of the various points on the computer network may be accomplished using a variety of known topologies. For example, the most common computer network topologies include bus, star, and ring configurations. Furthermore, communication between the computers connected to the network may be accomplished using a variety of known protocols. For example, the connected computers may communicate using TCP/IP, SNA, and APPN.

Generally, a host computer (e.g., server) may function as a centralized point on the network. For example, using any of the network topologies discussed above, a plurality of client computers may be interconnected such that the server controls the movement of data across the network. The host computer may have an operating system that may be used to execute a server application program that is adapted to support multiple clients. Typically, the server may service requests from a plurality of client computers that are connected to the network. Furthermore, the server may be used to administer the network. For example, the server may be used to update user profiles, establish user permissions, and allocate memory space on the server for a plurality of clients connected to the network.

In many computer networks, a large amount of data may be stored on the server and accessed by the attached client computers. For example, each client computer may be assigned a variable amount of storage space on the server. The assigned storage spaces may be private (i.e., protected) or made available to other clients, and the assigned storage spaces may be used to store a variety of file types, such as documents, email messages, etc. Furthermore, the server may be used to save public data (i.e., data that does not necessarily have a specific owner but may be accessed by any number of clients.) For example, public folders (i.e., directories) may be created on the server, and the public folders may store data that relates to group projects, company information, or any other data that may require access from more than one client.

The administration of a server is often a complex task that requires a great deal of software and hardware knowledge on the part of the administrator. Certain businesses may desire the functional advantages offered by a server, but may lack the expertise to effectively administer the server. Although computer consultants may be capable of providing the expertise, they tend to be costly. One of the functions often performed by a server administrator is undeleting files. For example, users of the computer network may mistakenly or unintentionally delete one or more of the computer files that are stored on the server. Because the computer network may include a large number of users having a plurality of files stored on the server, a simple and convenient method for undeleting files is desirable.

One technique for undeleting files involves restoring the deleted files from a backup storage device, such as a tape drive. Such a technique requires that the deleted file be saved on the backup storage device prior to being deleted. For example, many servers utilize a backup routine that periodically archives files that are stored on the server, and if a file is deleted prior to being archived on the backup storage device, the file may not be recoverable. Even if recoverable, a file that has been archived on the backup storage device may be outdated. For example, if the file has been modified between scheduled backups, the archived file on the backup storage device may not include these changes. In addition to the problems stated above, backup storage devices require expertise to configure, maintain and operate, and these devices add additional costs and complexities to the computer network.

The present invention is directed to overcoming, or at least reducing the effects of, one or more of the problems set forth above.

SUMMARY OF THE INVENTION

One aspect of the present invention is seen in a method for undeleting files in a computer system. The method includes flagging at least one deleted file with an identifier. The flagged deleted file is hidden in the computer system. A list of deleted files that have been flagged with the identifier is generated. The list of deleted files is comprised of a directory path hierarchy for each deleted file. A file is selected from the list of deleted files and undeleted.

BRIEF DESCRIPTION OF THE DRAWINGS

The invention may be understood by reference to the following description taken in conjunction with the accompanying drawings, in which like reference numerals identify like elements, and in which.

Figure 1:
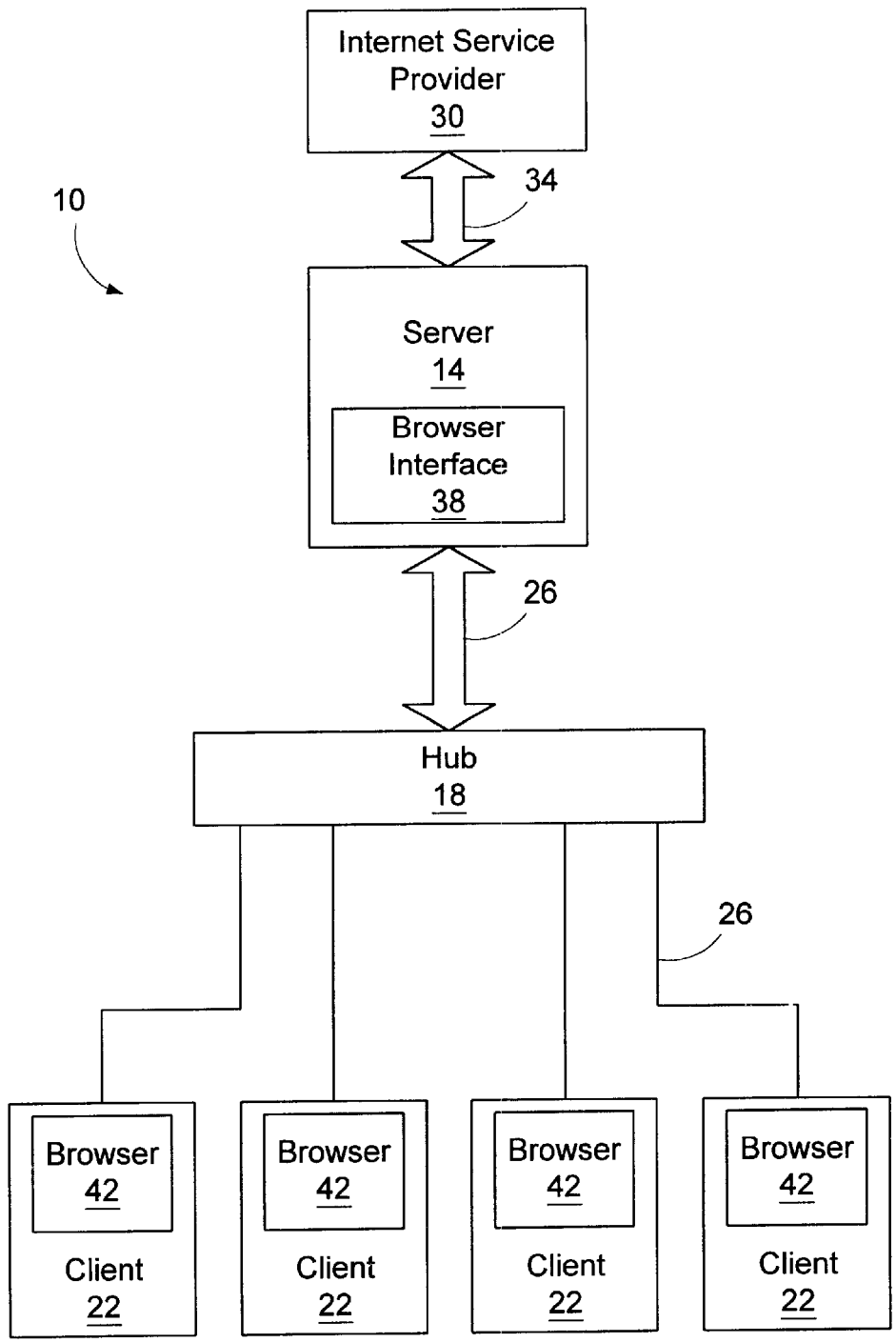
FIG. 1 is a simplified block diagram of a computer network in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a computer network 10 is shown. The computer network 10 may be configured using a variety of known topologies. For example, the computer network 10 may be configured as a ring, bus, or any other known method of interconnecting computers. In one embodiment, the computer network 10 is configured using a star topology and comprises a server 14, a hub 18, and a plurality of clients 22 that are coupled to the hub 18. It is contemplated that the hub 18 may comprise a variety of conventional switching or routing devices, depending upon the particular application.

The hub 18 may be used as an intermediary between the server 14 and the clients 22. Generally, the hub 18 directs the flow of data between the server 14 and the clients 22. For example, each client 22 attached to the hub 18 may be identified by a unique address. Accordingly, based on the unique address, data may be routed from the server 14 to the appropriate client 22. Furthermore, the hub 18 may control the flow of data from the clients 22 to the server 14 (i.e., the hub 18 may be a bi-directional device.) Moreover, the hub 18 may operate in conjunction with the server 14 to transfer data between two clients 22.

Although only one hub 18 is shown in FIG. 1, it is contemplated that a plurality of hubs 18 may be included in the computer network 10, which may increase the number of clients 22 that may be attached to the network 10. For example, in one embodiment, each hub 18 may be coupled to seven clients 22. Once a hub 18 is at maximum capacity, an additional hub 18 may be attached to the filled hub 18 and seven additional clients 22 may be attached to the empty hub 18. It is contemplated that the network 10 may be designed to service any number of clients 22, and in one embodiment, three hubs 18 may be stacked, as described above, and the server 14 may be connected to twenty-five clients 22.

It is contemplated that a variety of protocols may be used to control the flow of data in the network 10. For example, the server 14 and the clients 22 may transfer data using TCP/IP, SNA, APPN, or any other protocol adapted to facilitate the movement of data. In one embodiment, transferring data between the server 14 and the clients 22 requires client software operating on the clients 22 and server software operating on the server 14. The client software and the server software cooperate to transfer data. For example, the sender (e.g., client 22, server 14, etc.) may encapsulate data into a packet. The packet may include any additional information (e.g., addresses, etc.) that may be necessary to successfully transmit the packet across the network 10 to a receiver (e.g., client 22, server 14, etc.) The receiver may decapsulate the packet, removing any undesired information. Once decapsulated, the data contained in the packet may be processed.

The clients 22 may be personal computers (PC). For example, the clients 22 may be IBM compatible PCs or Apple compatible computers. Moreover, each client 22 may include a network interface card (not shown) that provides the necessary hardware for data to be transferred in the network 10. In addition to the client software, each client 22 may include an operating system, such as Windows® 95/98, Windows® NT, MAC OS7/8, etc.

The server 14 may be connected to the hub 18 using a network interface card (not shown.) As with any connection in the network 10, network interface cables 26 may be used to interconnect devices on the network 10. For example, the electrical connection between the server 14 and the hub 18 may be established using coaxial cable, twisted pair cable, fiber optic cable, or any other material conducive to carrying a signal. In addition, it is contemplated that the server 14 may be connected to an internet service provider (ISP) 30 using a variety of hardware configurations, such as ISDN, T1, ADSL, cable modem, etc. In one embodiment, the server 14 may be connected to the internet service provider 30 using a modem (not shown) and a connection to a local telephone line 34.

In one embodiment, the server 14 may be "headless", requiring remote service and administration. For example, the server 14 may be placed in the network 10 without being connected to a keyboard, monitor, mouse, or any other user input/output devices. Such a headless configuration is ideally suited for use in a setting where the server 14 is treated more as an appliance to enhance the network, rather than the central core of the network 10. For example, a small business using a simple peer-to-peer network 10 arrangement may wish to have additional services, such as email, centralized Internet access, common file storage and backup, file sharing, etc. Rather than using a more powerful, but more complicated, full-function server, the headless server 14 may be employed to provide the desired functionality without the overhead associated with the full-function server. Users of the headless server 14 may be less sophisticated computer users, and may desire an easily administered interface. To service or administer the server 14, the server 14 may include a browser interface 38. For example, the server 14 may be accessed by any of the attached clients 22 using a browser 42, such as Microsoft Internet Explorer, Netscape Navigator, etc.

The server 14 may be hard coded with a default IP address prior to being shipped to an end user. For example, the IP address 192.168.1.1 is a default dead net address from the Internet Assigned Numbers Authority (IANA) and may be used as an initial IP address. Once the network 10 is connected, the browser 42 that has been installed on the clients 22 may be directed to the default IP address that has been designated in the server 14. Using the browser 42, the clients 22 may access a simple to use browser interface 38 that has been preloaded in the server and contains a list of configuration options for the server 14. The browser interface 38 may include a simple to use graphical web page that allows the clients 22 to easily access and customize the configuration of the server 14.

In one embodiment, to simplify configuring the initial setup of the clients 22 (e.g., configuring the browsers 42 to access the browser interface 38), a companion disk comprising configuration software may be shipped with the server 14. The configuration software may be installed on the clients 22, simplifying the configuration of the individual browsers 42. Alternatively, it is contemplated that a network application program, such as TCP/IP, may be pre-installed on the clients 22, and the browsers 42 may be manually configured.

Figure 2:
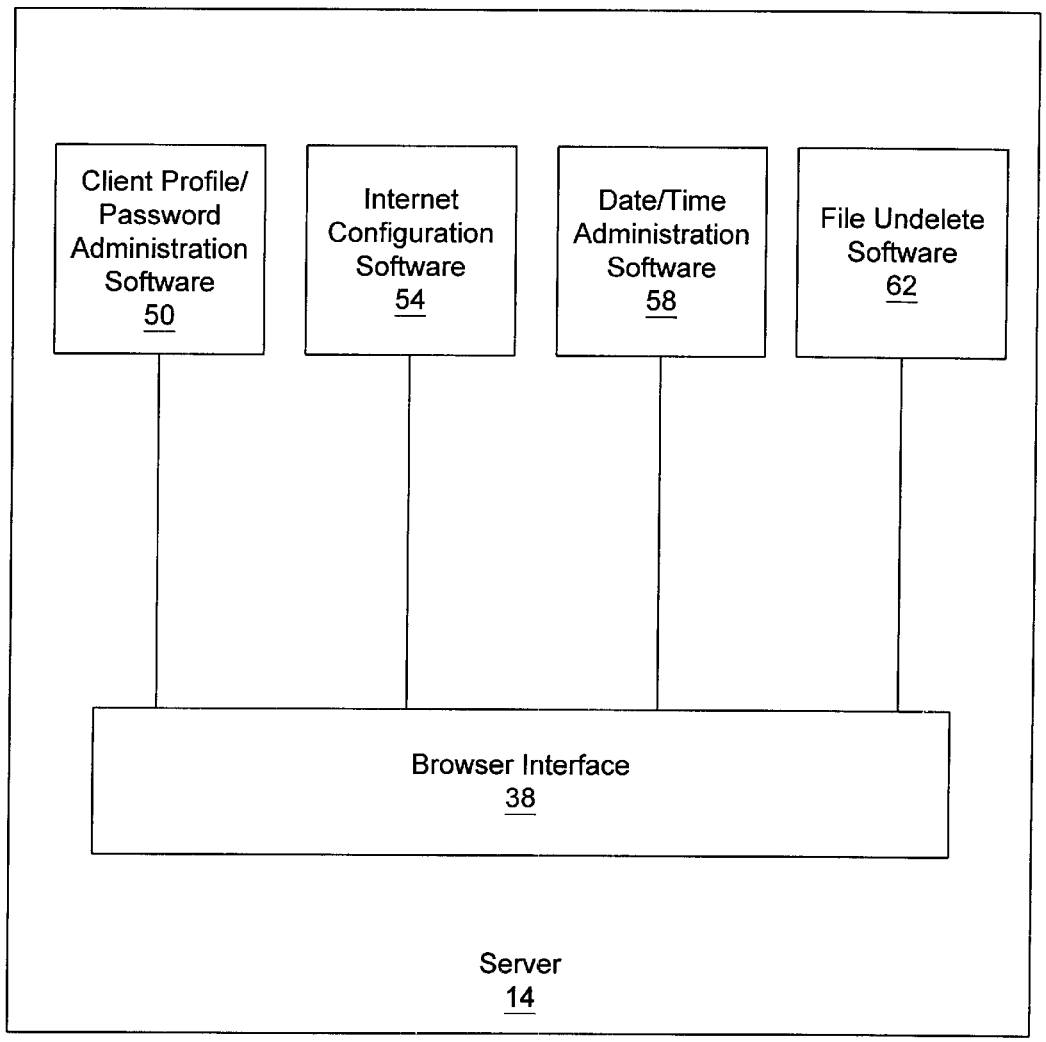
FIG. 2 is a diagram illustrating software applications executed by a server in the computer network FIG. 1.

Referring to FIG. 2, a block diagram illustrating examples of various administrative features that may be accessed using the browser interface 38 of the server 14, is provided.

As described above, the browser interface 38 may be used in conjunction with the browsers 42 of the clients 22 to simplify the administration, configuration, and customization of the server 14. It is contemplated that, depending upon the particular application, additional features may be added and administered using the browser interface 38 described above. In one embodiment, the browser interface 38 installed on the server 14 may include client profile and password administration software 50, internet configuration software 54, date and time administration software 58, and file undelete software 62.

As illustrated above, the server 14 may be interconnected with the clients 22 in the network 10. Before the clients 22 may access resources available on the server 14, each user is identified by a user profile that may be protected with a user password. It is contemplated that the first client 22 connected to the network 10 may access the server 14 via its browser 42 and the browser interface 38 using an administration profile and password provided by the manufacturer. Once the administrator has accessed the server 14, the administration profile and password may be changed, and the other users may be assigned user profiles and passwords. User profiles and passwords may be added, deleted, and changed as often as desired. Moreover, any user that has accessed the server 14 using the administration profile and password may have access to the administrative features of the software 50, 54, 58, and 62 on the server 14.

As illustrated above, the server 14 may be connected to the internet service provider 30. Using the browser interface 38 and the administration profile and password, the clients 22 may access and configure the server 14 with the appropriate internet settings. For example, the account information of the internet service provider 30 may be designated in the server 14, email server addresses may be initialized, and internet permissions assigned. Depending upon the desired internet usage, individual users may be granted internet access while others users connected to the network 10 may be denied internet access.

The date and time administration software 58 may allow the user to access the current date, time, and timezone set for the server 14 by the manufacturer. Since the preset date and time is likely not correct for the majority of users, the browser interface 38 and the administration profile and password may allow the user to reset these settings to the correct values for a particular locale.

As will be described below, the file undelete software 62 may be used to undelete files. For example, as described above, the clients 22 may store files (e.g., client data, system settings, etc.) on the server 14, and if these files are mistakenly deleted, the file undelete software 62 may be used to undelete and recover these files. The file undelete software 62 may be accessed using the browser interface 38 and may be understood with reference to FIG. 3 and 4.

Figure 3:
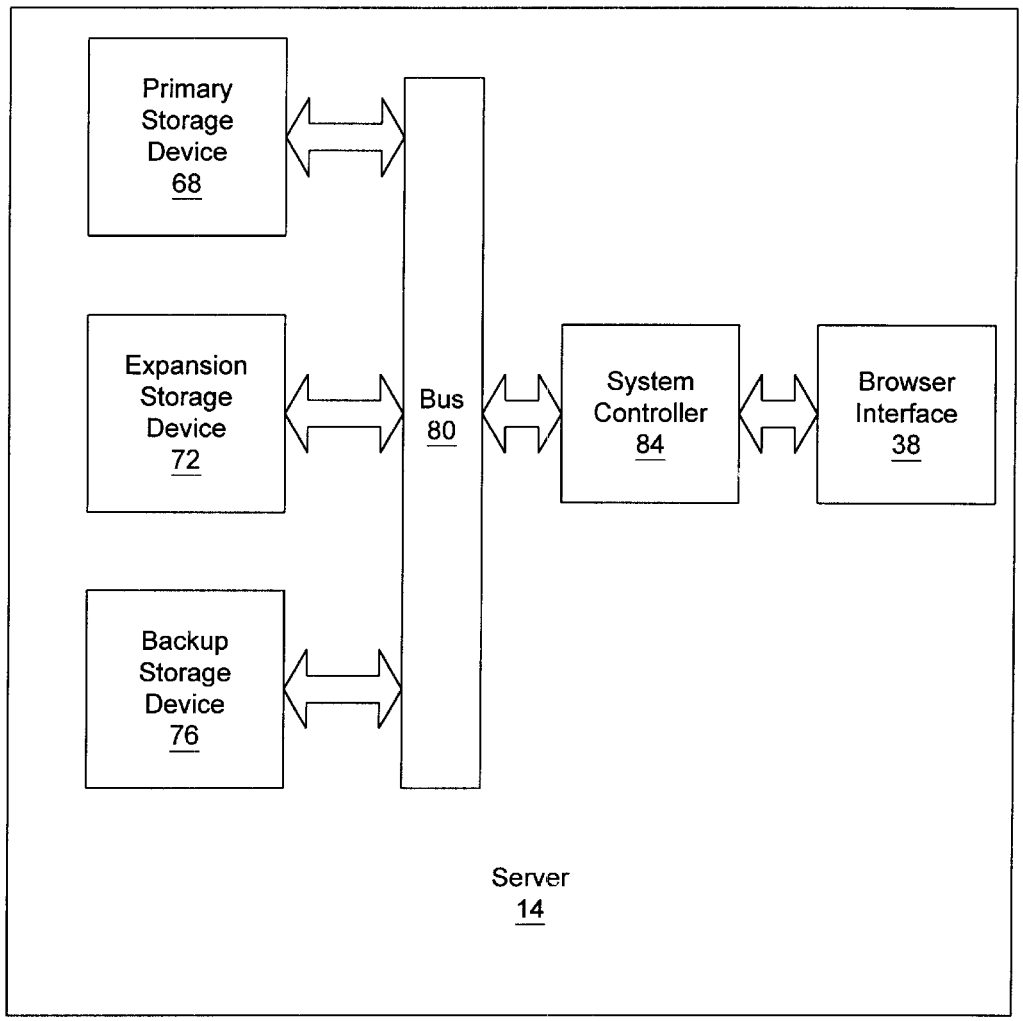
FIG. 3 is a simplified block diagram of the server of FIG. 1 illustrating data storage and retrieval hardware in accordance with one embodiment of the present invention.

In FIG. 3, the server 14 includes a primary storage device 68, an expansion storage device 72, a backup storage device 76, a bus 80, and a system controller 84. The storage devices 68, 72, and 76 may be coupled to the bus 80, and the system controller 84 may control the flow of data between the clients 22 and the storage devices 68, 72, and 76. Moreover, the system controller 84 may control the flow of data between the individual storage devices 68, 72, and 76.

The system controller 84 may be comprised of a variety of known devices. For example, the system controller 84 may be a microprocessor, microcontroller, or any other type of control logic. It is contemplated that the primary storage device 68 may be comprised of a variety of nonvolatile memory devices. Moreover, the storage capacity of the primary storage device 68 may be varied as a matter of design choice, and in one embodiment, the primary storage device 68 is a 6-gigabyte hard disk drive.

The primary storage device 68 may be used to save client data, system configuration settings, or any other appropriate data. Client data may include files placed on the primary storage device 68 by any one of the attached clients 22. For example, depending upon the configuration, each client 22 connected to the server 14 may create a user folder on the primary storage device 68. Once the user folders are created, the clients 22 may store data, such as documents, email messages, and any other files, on the primary storage device 68. System configuration settings may include any changes made to the factory configuration of the server 14. For example, the primary storage device 68 may save user names and passwords, internet service configurations, the current date and time, and any other configuration data.

The expansion storage device 72 may be comprised of a variety of nonvolatile memory devices. Moreover, the storage capacity of the expansion storage device 72 may be varied as a matter of design choice, and in one embodiment, the expansion storage device 72 is a 6.4-gigabyte removable hard disk drive. The expansion storage device 72 may be used to extend the overall data storage capacity of the server 14. For example, the expansion storage device 72 may function as an extension of the primary storage device 68 and may store the same types of data (e.g., client data, system configuration settings, etc.)

The system controller 84 may determine the allocation of storage space between the primary storage device 68 and the expansion storage device 72. For example, in one embodiment, the clients 22 have access to both the primary storage device 68 and the expansion storage device 72, and the clients 22 determine whether to save client data on the primary storage device 68 or the expansion storage device 72. Alternatively, the system controller 84 may automatically store the system configuration data and other data files on the primary storage device 68. Furthermore, although only one expansion storage device 72 is shown, it is contemplated that the expansion storage device 72 may be comprised of a plurality of removable hard disk drives or other nonvolatile memory devices.

Figure 4:
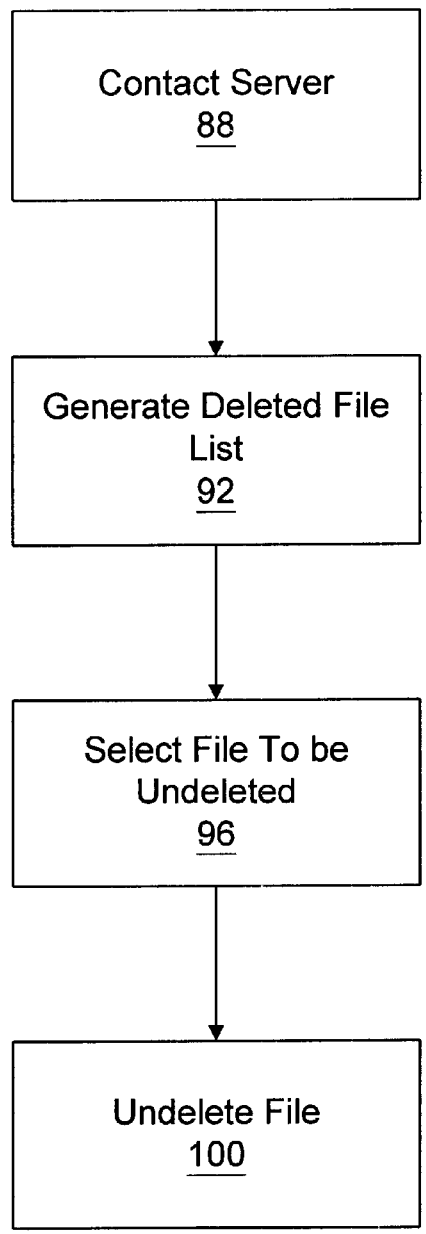
FIG. 4 is a flow chart illustrating a method for undeleting files in accordance with the present invention.

Turning now to FIG. 4, a flow diagram of a method for undeleting files is provided. In block 88, the file undelete software 62 may be accessed using the browser interface 38 of the server 14. For example, the clients 22 may direct their browsers 42 to the browser interface 38 of the server and access the administrative features of the software 50, 54, 58, and 62. In one embodiment, for security, the administrative features of the server 14 may only be accessed using the administration profile and password, although, those skilled in the art will appreciate that the server 14 may be configured to allow users with multiple profiles and passwords to administer the server 14.

Alternatively, it is contemplated that the file undelete software 62 may be accessed using an internet connection to the server 14. For example, because the server 14 is connected to the internet service provider 30, a remote user may connect to the internet and access the administrative features of the software 50, 54, 58, and 62 using the administration profile and password. Those skilled in the art will appreciate that a variety of security procedures may be implemented to provide selective remote access to the server 14. For example, a firewall may be used, requiring users desiring remote access to the server 14 to enter a user name and password prior to having access to the resources of the server 14.

Once connected to the server 14 and logged on to the network 10 using the administration profile and password, the clients 22 or remote user may navigate through a series of administrative menus that control the administrative features of the software 50, 54, 58, and 62. For example, the clients 22 may access a graphical web page that is stored on the server 14 and organized in an easy to use convenient format. In one embodiment, the user selects a button that launches the file undelete software 62.

In block 92, the file undelete software 62 generates a list of deleted files that may be undeleted. In one embodiment, a plurality of files may be stored on the primary storage device 68 and the expansion storage device 72. Generally, these files may be organized in a directory hierarchy that provides a convenient way to repeatedly find and access the same files. For example, a file named "report.doc" may be stored in a directory hierarchy named "g:\user\work\", where the letter "g" represents the particular storage device (e.g., primary 68, expansion 72, etc.) and "\user\work\" represents the path to the file "report.doc". Those skilled in the art will appreciate that the primary and expansion storage devices 68, 72 may include a plurality of directories (e.g., user, work, etc.) and a plurality of directory paths (e.g., "\user\work\") that may organize the locations of a plurality of files for a plurality of users. Furthermore, files located in the same directory are not permitted to have the same name, but files located in different directories may have the same name.

In one embodiment, a deleted file is flagged with an identifier and hidden from the user. In this example, rather than being deleted, the file still exists but is hidden from the user. The identifier may include any type of flag that is recognizable by the server 14, and in one embodiment, the identifier includes the date and time the file was deleted. Furthermore, the identifier may include the location of the file (i.e., the directory path.) As will be described below, when a file is undeleted, the undeleted file is returned to the same directory path, and if the path no longer exists, it is recreated by the file undelete software 62.

It is contemplated that multiple files having the same name may be created and subsequently deleted in the same directory. For example, a first file having the name "report.doc" may be created in the directory path "g:\user\work\" and subsequently deleted. Next, a second file having the same name "report.doc" may be created in the directory path "g:\user\work\" and subsequently deleted. In this case, only one version of the file named "report.doc" is flagged and hidden from the user. For example, rather than flagging and hiding multiple versions of the same file (i.e., the first and second versions of "report.doc"), only the last version of the file is flagged and hidden from the user. In this example, the first file named "report.doc" is deleted, and the second file named "report.doc" in the directory path "g:\user\work\" is flagged and hidden from the user. Those skilled in the art will appreciate that in another embodiment, multiple versions of the same file may be flagged and hidden from the user and that the number of versions of the same file hidden from the user may vary depending upon the application.

To prevent the number of deleted files from overtaxing the server 14, older deleted files may be periodically purged from the primary and expansion storage devices 68, 72. For example, in one embodiment, the identifier assigned to a deleted file may include the date and time the file was deleted. In addition, using the browser interface 38 and the administration profile and password, a threshold purge flag may be set in the server 14. The threshold purge flag may include a maximum time (i.e., expiration time) that deleted files are to be flagged and hidden from the users. A purge process may run periodically checking the identifier for each deleted file to determine whether that deleted file exceeds the threshold purge flag. For example, if the threshold purge flag is set for 10 days, during the purge process, deleted files having an age greater than 10 days are purged. Alternatively, if the threshold purge flag is set to 0, the purge process does not execute and the deleted files are not purged. It is contemplated that the threshold purge flag may be varied as a matter of design choice, and the purge process may operate as often as required by a particular application. In one embodiment, the threshold purge flag may be set between 0 and 30 days, and the purge process may execute every 6 hours.

In addition to the purge process described above, the deleted files may be purged manually at any time. For example, using the administration profile and password, the clients 22 may access the browser interface 38 of the server 14 and select to purge all deleted files. This may be desirable when storage space is low on the primary and expansion storage devices 68, 72. Once the deleted files are purged, the space occupied by the deleted files becomes free, and the file undelete software 62 may continue to use this space to flag and hide future deleted files.

Referring back to block 92, the file undelete software 62 generates a list of deleted files that have been flagged with the identifier and hidden from the user. For example, in one embodiment, the file undelete software 62 searches through the primary and expansion storage devices 68, 72 locating flagged deleted files, and generates a sorted list of the deleted files. It is contemplated that a variety of methods may be used to sort the list of deleted files. In one embodiment, the deleted files are sorted by directory path, and all files having the same directory path may be listed sequentially. For example, all deleted files in the directory path "g:\user\work\" may be grouped together and listed sequentially. Moreover, rather than using letters (e.g., "g") to differentiate the primary storage device 68 from the expansion storage device 72, the primary storage device 68 may be denoted as "Disk 1", and the expansion storage device 72 may be denoted as "Disk 2". In addition to listing the deleted files, the file undelete software 62 may include in the list the corresponding directory hierarchy to simplify locating a particular deleted file. For example, the deleted file "report.doc" may be presented in the deleted file list as "Disk 1:\user\work\report.doc". Because several deleted files may share the same name but be located in different directory paths, listing the directory hierarchy (e.g. "Disk 1:\user\work\") may be useful in locating a particular deleted file.

To avoid overwriting existing files, deleted files having the same names as existing files are suppressed and not included in the deleted file list. In one embodiment, while generating the deleted file list, the file undelete software 62 may compare flagged deleted files with existing files having the same directory hierarchy. For example, if a deleted file named "report.doc" was deleted from the directory "Disk 1:\user\work" and an existing file named "report.doc" is currently residing in "Disk 1:\user\work", the deleted file "report.doc" is suppressed and not included in the deleted file list, which prevents overwriting an existing file with a deleted file. In one embodiment, to prevent overwriting an existing file, deleted files are compared with existing files having the same directory hierarchy each time the list of deleted files is generated.

In block 96, from the list of deleted files generated in block 92 a deleted file may be selected to be undeleted. As illustrated above, the deleted files are sorted and organized in an easy to use list, and the list may be scrolled through to locate a particular file. In one embodiment, deleted files are undeleted individually and only one file may be selected at a time. However, it is contemplated that in another embodiment multiple files may be selected and undeleted in one session.

Once a file is selected in block 96, the selected file may be undeleted in block 100. The selected file may be undeleted by the file undelete software 62 and returned to the directory path from where it originated. For example, if the file "report.doc" was originally deleted from "Disk 1:\user\work", it is undeleted and returned to "Disk 1:\user\work". In one embodiment, because the deleted files are flagged and hidden from the user and not actually deleted, undeleting a file comprises removing the identifier from the file and making the file viewable to the user.

It is contemplated that the directory hierarchy a deleted file originally resided in may have also been deleted. In this case, when undeleting the file, the directory hierarchy is also undeleted, and the file is returned to its original location. For example, if a deleted file "report.doc" originally resided in a deleted directory hierarchy "Disk 1:\user\work", the directory path "Disk 1:\user\work" is also undeleted, and the file "report.doc" is returned as "Disk 1:\user\work\report.doc".

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for undeleting files in a computer system, comprising:
    flagging at least one deleted file with an identifier;
    hiding the flagged deleted file in the computer system;
    generating a list of deleted files that have been flagged with the identifier, the list of deleted files comprising a directory path hierarchy for each deleted file;
    comparing the deleted files with existing files residing in the same directory path hierarchy as the deleted files;
    suppressing from the list of deleted files, the deleted files which have the same name as existing files and version numbers less than the version numbers of existing files;
    purging from the list of deleted files flagged deleted files that are older than a predetermined time threshold from the computer system; selecting a file from the list of deleted files; and
    undeleting the selected file.

2. The method of claim 1, wherein the identifiers of the flagged deleted files include a date and a time that the files were deleted and purging the outdated flagged deleted files includes:
    comparing the identifiers of the flagged deleted files with a threshold purge flag; and
    removing from the computer system deleted files having an age greater than the threshold purge flag.

3. The method of claim 2, wherein purging the outdated flagged deleted files includes automatically comparing the identifiers of the flagged deleted files with the threshold purge flag based on a predetermined periodic schedule.

4. The method of claim 2, wherein the threshold purge flag has a programmable expiration time and purging the outdated flagged deleted files includes programming the expiration time of the threshold purge flag.

5. The method of claim 4, wherein programming the expiration time of the threshold purge flag includes programming the expiration time in the range of approximately 0–30 days.

6. The method of claim 1, wherein purging the outdated flagged deleted files includes manually removing the flagged deleted files from the computer system.

7. The method of claim 1, wherein generating the list of deleted files includes sorting the deleted files in the list based on the directory path hierarchy for the deleted files.

8. The method of claim 1, wherein undeleting the selected file includes returning the selected file to the directory path hierarchy it originated from.

9. The method of claim 8, wherein returning the selected file to the directory path hierarchy it originated from includes undeleting the directory path hierarchy that the selected file originated from.

10. The method of claim 1, wherein undeleting the selected file includes removing the identifier from the file and making the file viewable to a user.

11. A method for undeleting files in a computer system, comprising:
    flagging at least one deleted file with an identifier;
    hiding the flagged deleted file in the computer system;
    generating a list of deleted files that have been flagged with the identifier, the list of deleted files comprising a directory path hierarchy for each deleted file;
    comparing the deleted files with existing files residing in the same directory path hierarchy as the deleted files;
    suppressing from the list of deleted files, the deleted files which have names that are the same as the existing files;
    selecting a file from the list of deleted files; and
    undeleting the selected file.

12. A computer system, comprising:
    a processor; and
    a program storage device encoded with instructions that, when executed by the processor, perform a method for undeleting files in a computer system, the method comprising:
        flagging at least one deleted file with an identifier;
        hiding the flagged deleted file in the computer system;
        generating a list of deleted files that have been flagged with the identifier, the list of deleted files comprising a directory path hierarchy for each deleted file;
        comparing the deleted files with existing files residing in the same directory path hierarchy as the deleted files;
        suppressing from the list of deleted files, deleted files which have the same name as the existing files and version numbers less than the version numbers of existing files;
        purging from the list of deleted files flagged deleted files that are older than a predetermined time threshold from the computer system; and
        undeleting a file that has been selected by a user from the list of deleted files.

13. The computer system of claim 12, wherein the identifiers of the flagged deleted files include a date and a time that the files were deleted and purging the outdated flagged deleted files in the method includes:
    comparing the identifiers of the flagged deleted files with a threshold purge flag; and removing from the computer system deleted files having an age greater than the threshold purge flag.

14. The computer system of claim 13, wherein purging the outdated flagged deleted files in the method includes automatically comparing the identifiers of the flagged deleted files with the threshold purge flag based on a predetermined periodic schedule.

15. The computer system of claim 13, wherein the threshold purge flag has a programmable expiration time and purging the outdated flagged deleted files in the method includes programming the expiration time of the threshold purge flag.

16. The computer system of claim 15, wherein programming the expiration time of the threshold purge flag in the method includes programming the expiration time in the range of approximately 0–30 days.

17. The computer system of claim 12, wherein purging the outdated flagged deleted files in the method includes manually removing the flagged deleted files form the computer system.

18. The computer system of claim 12, wherein generating the list of deleted files in the method includes sorting the deleted files in the list based on the directory path hierarchy for the deleted files.

19. The computer system of claim 12, wherein undeleting the file that has been selected by the user from the list of deleted files in the method includes returning the selected file to the directory path hierarchy it originated from.

20. The computer system of claim 19, wherein returning the selected file to the directory path hierarchy it originated from in the method includes undeleting the directory path hierarchy that the selected file originated from.

21. The computer system of claim 12, wherein undeleting the file that has been selected by the user from the list of deleted files in the method includes removing the identifier from the file and making the file viewable to the user.

22. A computer system, comprising:
   a processor; and
   a program storage device encoded with instructions that, when executed by the processor, perform a method for undeleting files in a computer system, the method comprising:
      flagging at least one deleted file with an identifier,
      hiding the flagged deleted file in the computer system;
      generating a list of deleted files that have been flagged with the identifier, the list of deleted files comprising a directory path hierarchy for each deleted file;
      comparing the deleted files with existing files residing in the same directory path hierarchy as the deleted files;
      suppressing from the list the deleted files, deleted files which have the same name as the existing files; and
      undeleting a file that has been selected by a user from the list of deleted files.

23. A computer system comprising:
   means for flagging at least one deleted file with an identifier;
   means for hiding the flagged deleted file in the computer system;
   means for generating a list of deleted files that have been flagged with the identifier, the list of deleted files comprising a directory path hierarchy for each deleted file;
   means for comparing the deleted files with existing files residing in the same directory path hierarchy as the deleted files;
   means for suppressing deleted files from the list of deleted files which have the same name as the existing files and version numbers less than the version numbers of existing files;
   means for purging from the list of deleted files flagged deleted files that are older than a predetermined time threshold from the computer system; and
   means for undeleting a file that has been selected by a user from the list of deleted files.

24. A method for undeleting files using a client in a client-server computer system including one or more remote storage devices coupled to a server, the method comprising:
   flagging on a first remote storage device of the one or more remote storage devices at least one deleted file on the first remote storage device with an identifier;
   hiding the flagged deleted file on the first remote storage device from a first client;
   generating using a second client a list of deleted files on the one or more remote storage devices that have been flagged wit the identifier, the list of deleted files on the one or more remote storage devices comprising a directory path hierarchy for each deleted file;
   comparing the deleted files with existing files residing in the same directory path hierarchy as the deleted files;
   suppressing deleted files from the list of deleted files which have the same name as the existing files and version numbers less than the version numbers of existing files;
   purging from the list of deleted files flagged deleted files that are older than a predetermined time threshold from the computer system;
   selecting a file on a second remote storage device from the list of deleted files on the one or more remote storage devices; and
   undeleting the selected file on the second remote storage device.

25. The method of claim 24, wherein the first remote storage device includes the second remote storage device.

26. The method of claim 24, wherein the first client and the second client comprise a single client.

27. A computer system comprising:
   a processor; and
   a program storage device encoded with instructions that, when executed by the processor, perform a method for undeleting files in a computer system, the method comprising:
      flagging on a first remote storage device of one or more remote storage devices at least one deleted file on the first remote storage device with an identifier;
      hiding the flagged deleted file on the first remote storage device from the processor;
      generating a list of deleted files on the one or more remote storage devices that have been flagged with the identifier, the list of deleted files on the one or more remote storage devices comprising a directory path hierarchy for each deleted file;
      comparing the deleted files with existing files residing in the same directory path hierarchy as the deleted files;
      suppressing deleted files from the list of deleted files which have the same name as the existing files and version numbers less than the version numbers of existing files;
      purging from the list of deleted files flagged deleted files that are older than a predetermined time threshold from the computer system; and selecting a file on a second remote storage device from the list of deleted files on the one or more remote storage devices; and undeleting the selected file on the second remote storage device.

28. The computer system of claim 27, wherein the first remote storage device includes the second remote storage device.

29. A client-server computer system, comprising:

means for flagging at least one deleted file on a remote storage device with an identifier;

means for hiding the flagged deleted file on the remote storage device;

means for generating a list of deleted files on one or more remote storage devices that have been flagged with the identifier, the list of deleted files comprising a directory path hierarchy for each deleted file; and means for comparing the deleted files with existing files residing in the same directory path hierarchy as the deleted files;

means for suppressing deleted files from the list of deleted files which have the same name as the existing files and version numbers less than the version numbers of existing files;

means for purging deleted files from the list of deleted files flagged deleted files that are older than a predetermined time threshold from the computer system; and means for undeleting a file that has been selected by a user from the list of deleted files on the one or more remote storage devices.

* * * * *